(No Model.)
J. YOUNG.
CUT-OFF GEAR FOR STEAM ENGINES.
No. 330,361. Patented Nov. 10, 1885.
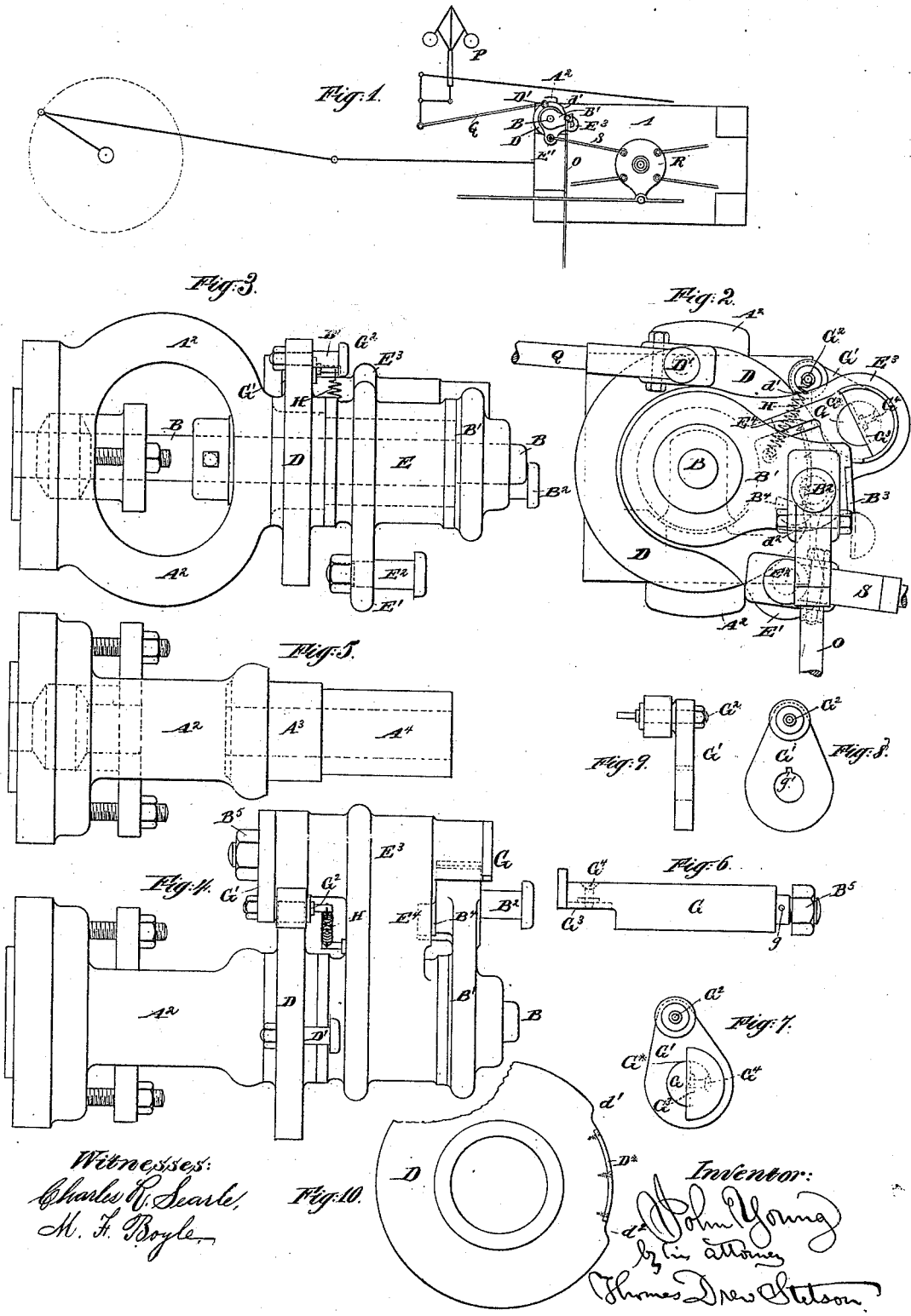

UNITED STATES PATENT OFFICE.

JOHN YOUNG, OF NEWARK, NEW JERSEY, ASSIGNOR TO THE WATTS, CAMPBELL COMPANY, OF SAME PLACE.

CUT-OFF GEAR FOR STEAM-ENGINES.

SPECIFICATION forming part of Letters Patent No. 330,361, dated November 10, 1885.

Application filed July 31, 1885. Serial No. 173,170. (No model.)

*To all whom it may concern:*

Be it known that I, JOHN YOUNG, of Newark, in the county of Essex and State of New Jersey, have invented a certain new and useful Improvement in Cut-Off Gear or Expansion-Gear for Steam-Engines, of which the following is a specification.

The improvement applies to all that class of valve-gear known as "releasing" or "disengaging." In the Corliss valve-gear, which is included in this class, the valves are actuated by rocking stems, there being a separate stem for each of the two valves. I employ such arrangement. A vacuum under a piston or other nearly-constant force acts on an arm on the stem in the direction to close the valve. The mechanism of the engine engages with the valve-stem at the proper period and turns it forcibly in the direction to open. The point of cut-off is determined by a variable stop, which, being controlled by a governor sensitive to changes of velocity, disengages the arm which is keyed to the valve-stem from the mechanism operated by the engine, and allows it to turn automatically in the direction to close the valve. This takes place earlier or later in the stroke as the governor shall indicate is required to maintain a uniform speed.

The improvement relates to the details of the arms and engaging means. The ordinary provisions for effecting this are open to objections which my improved construction avoids.

The accompanying drawings form a part of this specification, and represent what I consider the best means of carrying out the invention.

Figure 1 is a general side elevation of the engine and governor, one of the steam valve-stems and its immediate connections being fully shown, the location of the other steam-valve and of the exhaust-valves being obvious. The remaining figures are on a larger scale. Fig. 2 is an end view of one of the valve-stems and the immediately adjacent parts. Fig. 3 is an elevation at right angles thereto. Fig. 4 is a corresponding plan view. Fig. 5 is a plan view showing the stationary parts alone. The remaining figures show details detached. Fig. 6 is a plan view of a slightly-rolling shaft, which performs important functions. Fig. 7 is an end view of the same after the arm and roller by which it is controlled have been attached. Fig. 8 is a face view, and Fig. 9 an edge view, of said arm and roller. Fig. 10 is a face view of the disk, which, as it is slightly turned by the governor, determines the variable period at which the valve is liberated.

Similar letters of reference indicate corresponding parts in all the figures where they occur.

A is the fixed frame-work of the engine, certain parts being designated, when necessary, by additional marks, as A'. B is the stem of one of the two steam-valves.

As the two are the reverse one of the other, a description of one will suffice for both. The valve may be the ordinary circular sliding Corliss valve, and the stem may be connected thereto in the ordinary manner. A stuffing-box having a gland, A', with means for adjusting it insures a practically steam-tight joint in the ordinary manner.

The protruding portion of the valve-stem B is supported by a yoke, $A^2$, firmly bolted on the cylinder A. The exterior of $A^2$ is turned to form bearings for other partially-turning parts. On the extreme end of the valve-stem B is keyed an arm, B', in which is set a pin, $B^2$, connected by a link, O, with a piston of a dash-pot, (not represented.) A partial vacuum under the piston urges this pin $B^2$ downward, and promptly induces a partial rotation of the stem B, so as to close the valve the moment it is liberated from other controlling agencies. The arm B' carries also a contact-piece, $B^3$, which is made of hardened steel with a nicely-finished corner, and performs important functions.

D is a disk capable of turning on a bearing, $A^3$, formed on the exterior of $A^2$, and having two inclined offsets, $d'$ $d^2$, in its periphery with a considerable space between them. It is turned slightly in one direction and the other as the changes of speed in the engine occur, being controlled by a pin, D', actuated by a rod or link, Q, connecting with a governor, P.

E is a sleeve turning loosely on a bearing, $A^4$, formed on the exterior of $A^2$, and having an arm, E', in which is set a pin, E², connected by a link, S, to the proper pin on the wrist-plate R. This sleeve E consequently rocks uniformly and strongly as the engine revolves. Another arm, E³, carried on this sleeve E, is equipped with a device for engaging the contact-piece B³ on the arm B' and liberating it at the proper time. It presents a long and adequate bearing for a short shaft, G, which is free to turn to a short extent in its long bearing in E³, being urged to turn in one direction by a spring, H, and controlled through the aid of an arm, G, secured by a nut, G⁵. In this arm is set a pin, G², carrying an anti-friction roller which rolls on the periphery of the disk D so as to partially turn the shaft G against the force of the spring H whenever it passes an offset d' or d². One offset, d², is only brought into action under extraordinary circumstances, as when the belt breaks and the governor-balls sink below the lowest proper working positions. The other offset, d', is in ordinary conditions of working brought into action at each revolution of the engine, and liberates the valve at the right period in the stroke. The shaft G engages with and liberates the valve-stem by means of a corner, G*, of the contact-piece G³, which engages and disengages the contact-piece B³ on the arm B' as the shaft G is slightly turned in one direction and the other. The contact-piece, of hardened steel, G³, has a cylindrical projection forged on its back which, engages in a corresponding recess bored in the adjacent portion G. It is held firmly by a screw, G⁴.

The lever G' is secured against turning on the shaft G by means of a radial pin, g, inserted through the latter, (see Fig. 6,) which is received in a spline-groove, g', in the arm G'. (See Fig. 8.) The whole is held in place by the nut G⁵.

D* is a facing, of sole-leather or analogous durable but slightly yielding material, secured on the periphery of the disk D. Its function is to soften the concussion and deaden the sound when the roller moves smartly against the disk after each engagement of G³ with B³.

Operation: The sleeve E, rocked strongly and to a uniform extent by the action of the engine, engages the arm B' and forcibly turns the shaft B so as to open the valve at the right period in each stroke. It liberates it after one-fourth or some other fraction of the stroke of the piston has been performed, and the valve promptly shuts by the action of the piston in the dash-pot, being cushioned by the air therein to avoid concussion in stopping. The point in the stroke at which the liberation is effected depends upon the position of the disk D, which is controlled by the governor P. So long as the speed is uniform the liberation will be effected at a uniform point. When from any cause the engine commences to run too fast, the governor, acting in the well-known way through the link O, turns the disk D a little to the right. Thenceforward the roller on the pin G² meets the inclined offset d' earlier in the stroke, and the valve is liberated earlier and closes earlier, and gives less steam. When, on the contrary, the engine commences to run too slowly, the governor shifts the link O, and consequently turns the disk D in the opposite direction. This delays the contact of the roller with the offset d', and the valve is shut later. Under the latter condition the engine gets more steam at each stroke, and works with greater power, so that the speed immediately rises again. The ordinary provisions for effecting these functions are faulty, for the reason, among others, that the parts are liable soon to wear loose and shackly. My shaft G, having the long bearing described, avoids appreciable wear. The slight use to which the parts are subjected can be endured by ordinary material for a very long period without appreciable looseness. The arm G' is easily detached and replaced to allow the insertion and removal of the shaft G from the opposite side of the arm E³ by operating the nut G⁵. The arm is certain to be engaged in the correct position on the shaft G by virtue of the pin g and spline g' engaging together, as shown.

A condition of much importance in any disengaging valve-gear is that the governor shall be disturbed in the slightest possible degree by the action of the cut-off device to insure perfect regulation. The distribution of forces in my device accomplishes this to an extent far superior to the ordinary releasing-gear.

I provide the arm E' with a projection, E⁴, faced with leather, to act efficiently and silently in engaging with a projection, B⁴, on the arm B', and insuring that the valve-stem B shall be turned in the direction and to the proper extent to effect the closing before the termination of each stroke. This and many of the other parts serve in the same manner as corresponding parts in the ordinary Corliss engine.

One advantage of my mechanism over any before known to me is the absolute uniformity of leverage given to the action on the detaching-gear under all conditions.

The invention avoids the click which takes place when the crab-claw ordinarily employed is disengaged.

In my invention the parts remain steadily in contact after the roller is dropped upon the leather, and the offset d' is always in practice so gentle that it lifts the roller and effects the disengaging without noise.

Modifications may be made without departing from the principle or sacrificing the advantages of the invention. I can change the forms and proportions within wide limits. The gravity of a heavy piston in the dash-pot may serve instead of a partial vacuum under a light piston to induce the proper tension on the link O, and insure the prompt turning of the stem B to close the valve so soon as it is liberated. The contact-piece B³ may be held in the arm B' by a projection on the back of the contact-piece engaging in a recess in the arm B' in the same manner as I have described for the contact-piece $G^3$ on the shaft G.

Instead of the circular sliding valves herein referred to, the valves may be ordinary flat slide-valves, the rocking stems being engaged with them by any suitable means. I can use the devices without the anti-friction rollers W.

Instead of the complete disk shown as the part D, it is sufficient if only that portion of the disk is employed which carries the sunk portion and the two offsets or cams $d'$ $d^2$.

I claim as my invention—

1. In a valve-gear, the combination, with the arm $E^3$, rocked by the engine, of the partially-rolling shaft G, having the operating-arm $G'$, pin $G^2$, and contact-piece $G^3$, adapted to serve with a suitable contact-piece carried on an arm of the valve-stem, and with the disk D, having the offsets $d'$ $d^2$, controlled by the governor, substantially as herein specified.

2. The operating-arm $G'$, reliably engaging means $g$ $g'$ and holding-nut $B^5$, in combination with the partially-turning shaft G, carried in the arm $E^3$, worked by the engine, and with the arm $B'$, fixed on the rocking valve-stem B, and with means, as shown, for effecting the liberation of B' at varying periods, as herein specified.

3. In a valve-gear, the yokes $A^2$, formed each with an extension, $A^3$ $A^4$, adapted to form a bearing for the disk D, rocked by the governor, and sleeve E, rocked by the engine, in combination therewith and with the partially-rotating valve-stem B, and with the short shaft $G^3$, having the arm $G'$, pin $G^2$, and roller W, all substantially as herein specified.

In testimony whereof I have hereunto set my hand at New York city, this 23d day of July, 1885, in the presence of two subscribing witnesses.

JOHN YOUNG.

Witnesses:
G. A. WATTS,
CHARLES R. SEARLE.